May 27, 1930. J. J. BARRY 1,759,828
FILLETING MACHINE
Filed April 30, 1927   3 Sheets-Sheet 1

INVENTOR
James J. Barry
BY
Howard P. King
ATTORNEY

May 27, 1930.  J. J. BARRY  1,759,828
FILLETING MACHINE
Filed April 30, 1927  3 Sheets-Sheet 2
Fig. 2.
Fig. 3.
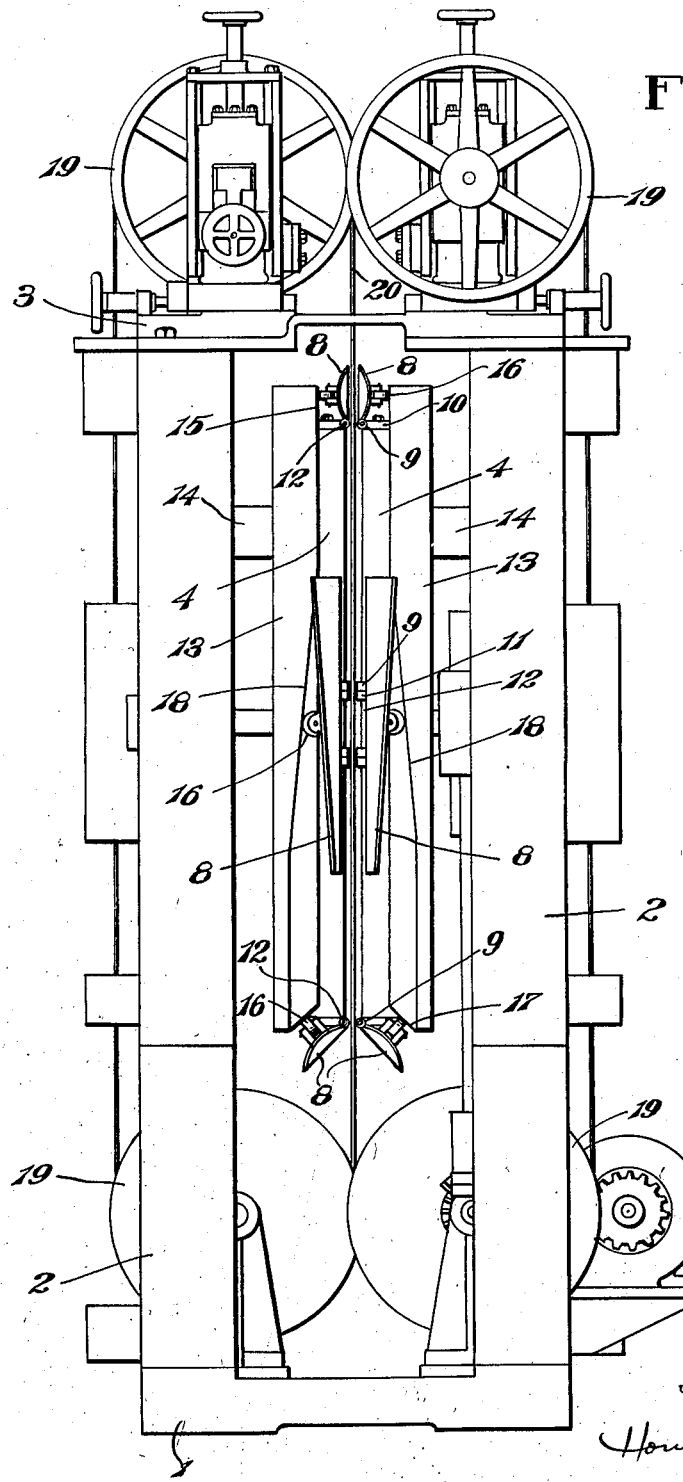
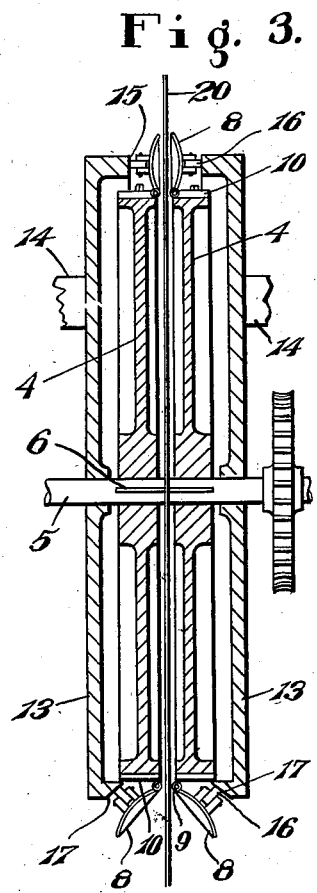
INVENTOR
James J. Barry
BY
Howard P. King
ATTORNEY

Patented May 27, 1930

1,759,828

UNITED STATES PATENT OFFICE

JAMES J. BARRY, OF GLOUCESTER, MASSACHUSETTS, ASSIGNOR TO FROSTED FOODS COMPANY, INC., OF DOVER, DELAWARE, A CORPORATION OF DELAWARE

FILLETING MACHINE

Application filed April 30, 1927. Serial No. 187,784.

This invention relates to fish filleting machines, and the objects of the invention are to provide a machine of this character which will operate at maximum speed with greatest reliability; to obtain a clean cut of the so-called back bone of the fish from the fish flesh; to prevent tearing the fish flesh; to prevent the fish from remaining in the carriages and being in the way of inserting a new fish at the front or feed side of the machine when the carriage returns thereto; to enable the fillets or severed fish flesh to be discharged and separated automatically from the back bone; to overcome the deflecting action of the muscles of the fish on the band knife or cutter; to cause the band knife to follow close to the back bone of the fish; to secure simplicity of construction and operation, and to obtain other advantages and results as may be brought out in the following description.

Referring to the accompanying drawings in which like numerals of reference indicate similar parts throughout the several views:

Figure 2 is another elevation of said machine, looking at the front of the same;

Figure 3 is vertical diametric sectional view of the carriage-supporting wheels and carriage-operating cams;

Figure 1:
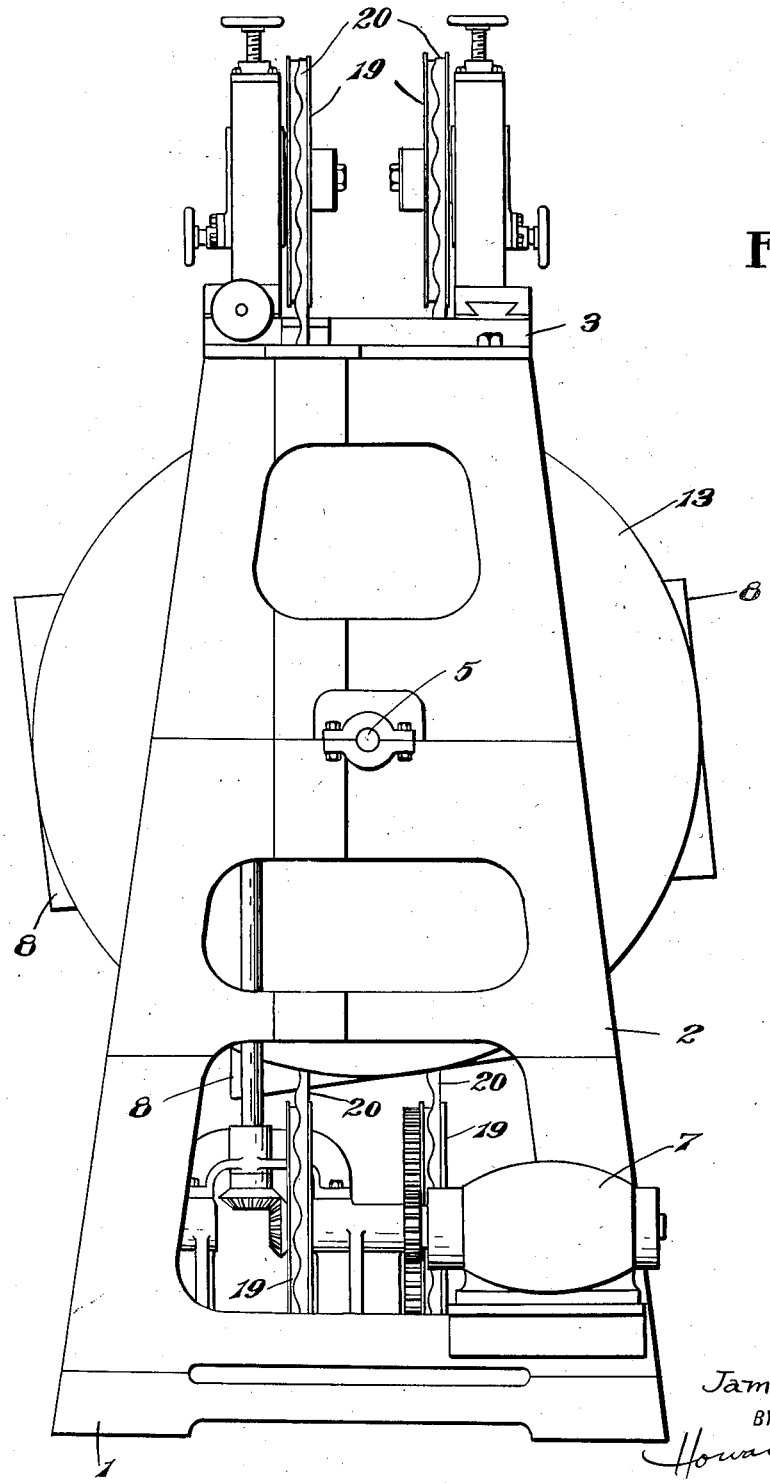
Figure 1 is an elevation of a machine embodying the present invention, looking at the same from what may be termed the side.
Figure 4:
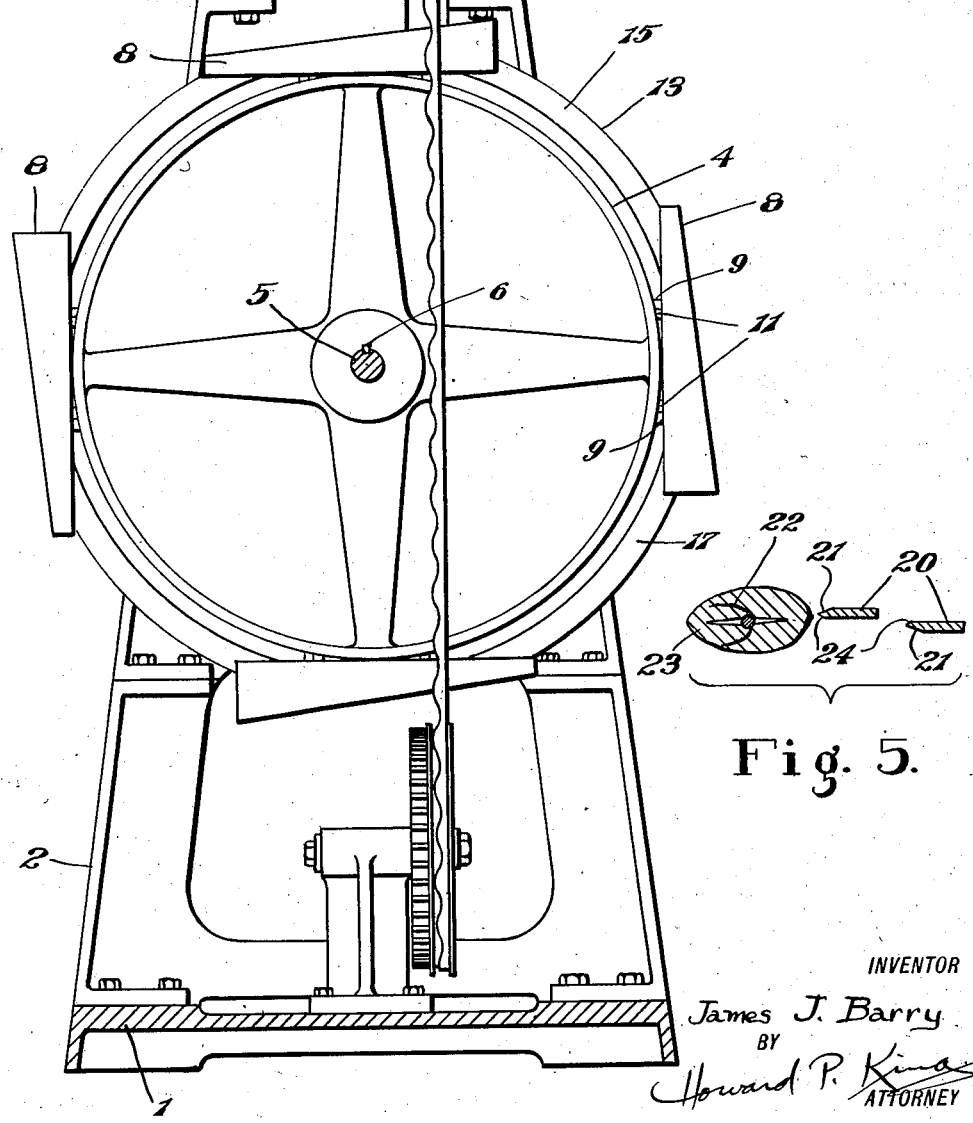
Figure 4 is a vertical sectional view on line 4—4 of Fig. 2.

In the specific embodiment of the invention illustrated in said drawings, the reference numeral 1 indicates a suitable base. A pair of parallel, spaced and upright frames 2, 2 are secured to the base, said frames being connected at their tops by a head 3. Preferably the frames are at opposite sides of the machine, thus leaving the middle part open from front to rear. In this middle open part are a pair of parallel carriage-supporting wheels 4, 4 mounted on a transverse shaft 5 (see Fig. 3), which is suitably carried in bearings in the frames 2, 2. Said wheels are secured to the shaft in any appropriate manner, as by key 6, so as to rotate therewith, the shaft being driven by any desired motive power, such as the indicated electric motor 7 through the agency of any appropriate train of gearing interposed between said motor and the shaft. The construction is such that a continuous rotation of the wheels 4, 4 may be had, said wheels rotating simultaneously and in parallel relation.

Each wheel 4 has one or more carriages 8 at its periphery, said carriage on one wheel being directly opposite a carriage on the other wheel so the two will co-operate to provide a holder or pocket within which the fish may be placed. Each carriage is preferably of elongated and hollowed out construction so as to properly receive, fit and hold the fish. For mounting the carriage, I have shown a hinge connection, constituting lugs 9 on one longitudinal edge of the carriage and a hinge leaf 10 with lugs 11 secured to the wheel with a hinge pin 12 extending through the several lugs. This construction enables the carriage to swing sidewise or like a door, and also enables parts to be readily replaced in case of breakage. Furthermore, as clearly shown in Figures 2 and 3, the pivoting or hinging of the carriage is adjacent the face of the wheel toward the other wheel. The opposed carriages may therefore be swung into substantially parallel position with only a small gap between them. The hinging of the carriages, however, enables the same to be swung open or away from each other for disengaging the fish.

In order to maintain the carriages closed or swung toward each other, for the desired portion of the path of revolution of the carriages, and to permit opening of the carriages for the remaining portion of that path, I provide a cam 13, overlying each wheel 4, and for convenience shown as mounted on the shaft 5 carrying said wheels, but held from rotating and given proper rigidity by suitable brackets 14 connected to the frames 2. Said cams provide inwardly directed flanges or cam-surfaces 15 against which will ride an appropriate contact member, such as roller 16, on the carriages. As shown, the cam surface 15 is vertical or in a plane parallel to wheels 4 at the upper portion of the cam, thereby holding the carriages in closed position as they pass around the upper portion of the path of revolution. Other portions 17 of the cam surfaces 15 slope outward, for instance as at the bottom, thereby enabling the carriages to swing apart or open for discharging the fish, after which the cam surface gradually returns to the vertical, as at 18, to close the carriages again. In this manner, the fish may be discharged at a proper place after passing over the top position of the wheels, the opening of the carriages also enabling the parts of the fish, which are cut as will be next described, to be discharged into separate channels, and thus be automatically assorted with the flesh part separated from the bone part. It may be here noted that I have made no attempt to illustrate any preferred position of opening or closing of the carriages, it sufficing for the purpose of this application to state that the opening occurs after the carriages have passed the knives, and that the closing be effected after the fish have been discharged. For combining the machine with another machine (not shown) for automatically feeding the fish to the carriages, it may be desirable to effect the closure at the front or feed side of the machine at a point where the fish are fed in, but this feature may be varied as found most desirable or expedient, and for hand feeding, I may close the carriages at a point prior to the feeding position and force the fish into the carriages while closed.

Figure 5:
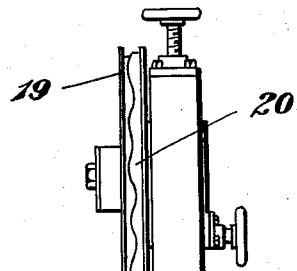
Figure 5 is a somewhat exaggerated and diagrammatic view of the knives and a fish in cross section showing the character of the knives and mode of operation.

Arranged at the top and bottom of the machine, in planes transverse to the plane of the carriage supporting wheels, are vertical wheels 19 for band-knives or cutters 20, said wheels being arranged in pairs, one at the top and one at the bottom but both in the same plane so the knives may extend with reaches from one wheel to the other like a band-saw and be continuously revolved. Preferably one of these band-knives is in a plane in front of the transverse shaft 5 for the carriage wheels 4 and the other is in a vertical plane behind said shaft. Furthermore, one of the band-knives 20 and its two wheels 19 are on one side of the machine and the other knife and its wheels 19 are on the other side of the machine, but both knives have one reach passing between the pair of carriage supporting wheels 4. As shown in Figure 5, one knife is offset slightly from the central plane in one direction, whereas the other knife is offset slightly in the other direction so that as the fish, carried in said carriages is passed across said knives, one knife will pass on one side of the back-bone of the fish and the other knife will pass on the other side of the backbone. Actuation of said knives is obtained through proper bearing of the two lower wheels 19 to the same motor 7 which rotates the carriage wheels in the present disclosure, but obviously this may be otherwise if so desired.

In order to cause the knives to hug close to the bone while making the cuts, each knife is provided with a long taper 21 rearwardly from its cutting edge outwardly away from the side of the blade next the bone. But in order to prevent the muscles or other resistive parts in the fish, indicated at 22 in the diagrammatic cross-section of a fish 23 shown in Figure 5, from deflecting the knives to such extent as to cut into the bone or perhaps entirely through the bone, I provide a short taper 24 rearward from the cutting edge and toward the side which cuts next to the bone. It may likewise be added at this time, that while I have shown the knives as having a longitudinally wavy cutting edge, merely because it is preferred, it may be otherwise if so desired.

Obviously other detail changes and modifications may be made in the construction and operation of my improved filleting machine without departing from the spirit and scope of the invention, and I do not wish to be understood as limiting myself to the exact structure shown or described, except as set forth in the following claims when construed in the light of the prior art.

Having thus described the invention, I claim:—

1. A fish filleting machine, comprising a pair of rotary members, knives operating between said members, and carriages carried by said rotary members, said carriages being hinged to swing away from the plane of the knife after passing the same for discharging the fish from the carriage after the fish is cut by said knives, said carriages retaining all of the cut portions of the fish until said carriages are swung open.

2. A fish filleting machine, comprising a pair of rotary members, knives operating between said members, and carriages hinged to said rotary members, said carriages being hinged to swing away from the plane of the knife after passing the same for discharging the fish from the carriage after the fish is cut by said knives, said carriages retaining all of the cut portions of the fish until said carriages are swung open.

3. A fish filleting machine, comprising a pair of rotary members, knives operating between said members, carriages carried by said rotary members, said carriages having means whereby the same may be opened and closed respectively away from and toward the plane of the said knives, and means for controlling the opening and closing of said carriages, said carriages retaining all of the cut portions of the fish until said carriages are swung open.

4. A fish filleting machine, comprising a pair of rotary members, knives operating between said members, carriages hinged to said rotary members arranged to close toward each other in pairs on opposite sides of the knives, said carriages adapted to open and close, and a cam for controlling the opening and closing of said carriages.

5. A fish filleting machine, comprising a pair of rotary members, knives operating between said members, carriages hinged to said rotary members, said carriages adapted to open and close, cams positioned adjacent the periphery of said members and in engagement with said carriages for controlling the opening and closing thereof.

6. A fish filleting machine comprising a pair of rotary members, knives operating between said members, carriages hinged to said rotary members adapted to receive a fish and carry the same past the knives for cutting the fish flesh from the back-bone of the fish, said carriages adapted to open and close, and cams positioned adjacent the periphery of said members opposite said carriages with a surface for maintaining the said carriages closed during the said passage of the carriages past the knives for cutting the fish, and having a surface for permitting the carriages to open after the carriage has passed said knives so as to discharge the fish.

7. A fish filleting machine comprising means for cutting fish flesh from opposite sides of the back-bone of a fish so as to obtain two fillets on opposite sides of the back-bone and cut therefrom, and means for automatically discharging said fillets and back-bone in separated condition so as to assort the fillets from the back-bone.

8. A fish filleting machine comprising means for holding and passing fish across a knife, a knife for cutting said fish, said knife having a cutting edge which tapers to said edge from both sides of the blade.

9. A fish filleting machine comprising means for holding and passing fish across a knife, a knife for cutting said fish, said knife having a cutting edge which tapers from both sides of said knife to said edge, the taper on one side extending inward from the edge a less distance than the other taper.

10. A band knife having a cutting edge, the margin of said band next the cutting edge tapering to said edge from both sides of the band, with one of said tapers extending inward from said cutting edge a less distance than the other taper.

11. A band knife having a longitudinally wavy cutting edge, the margin of said band next the said wavy cutting edge tapering to said edge from both sides of the band, with one of said tapers extending inward from said cutting edge a less distance than the other taper.

12. A fish filleting machine comprising means for holding and passing the fish to be treated across a knife, a knife for cutting the fish adjacent its backbone, said knife having a cutting edge which tapers from both sides of the knife to said edge, the taper on the side adjacent the backbone of the fish when the knife is in operative position, extending inward from the edge a less distance than the taper on the side remote from said backbone of the fish.

JAMES J. BARRY.